United States Patent Office.

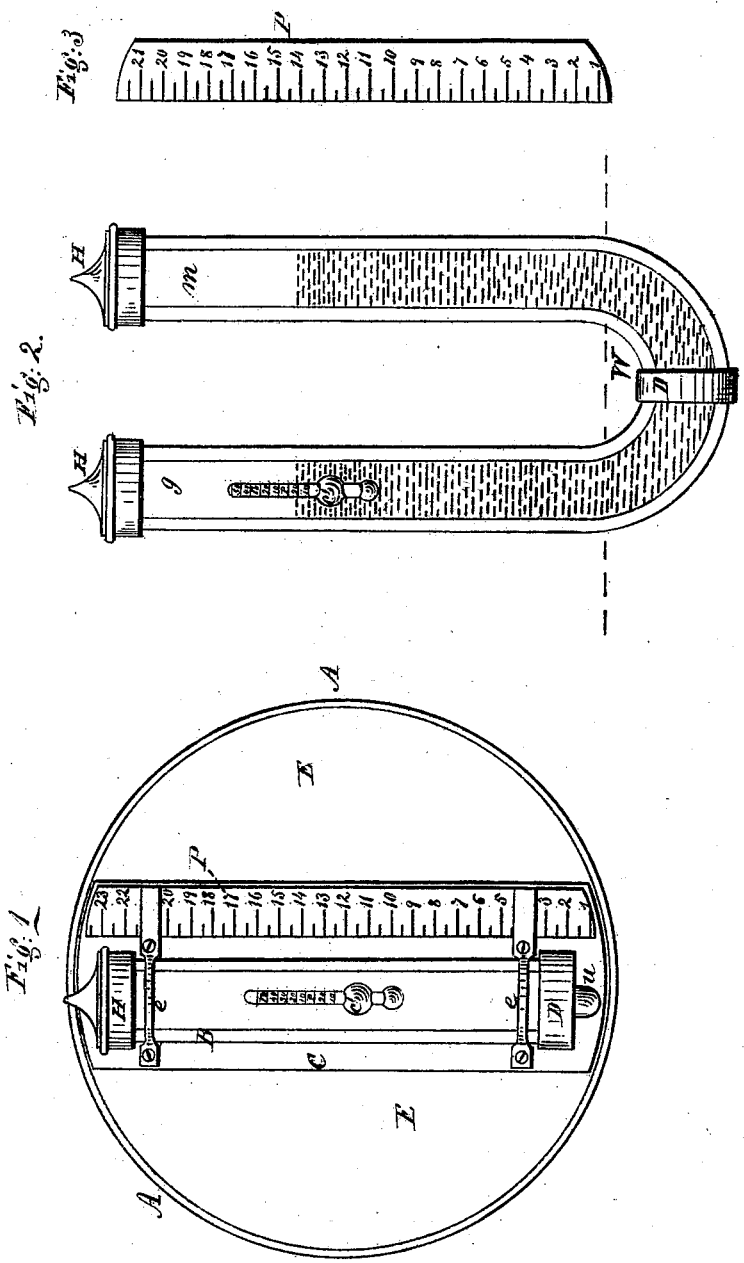

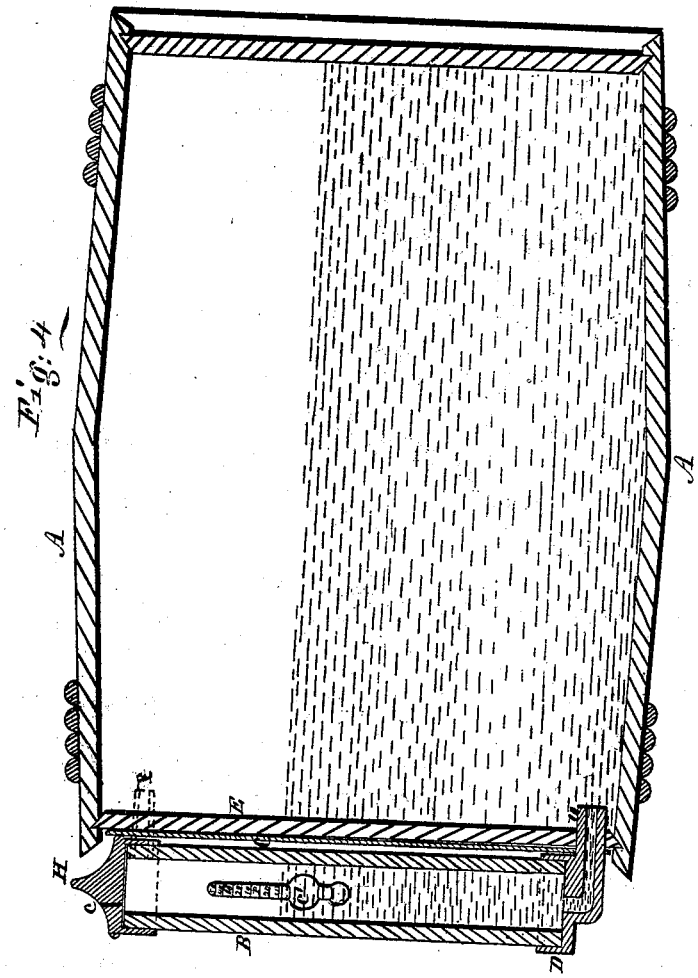

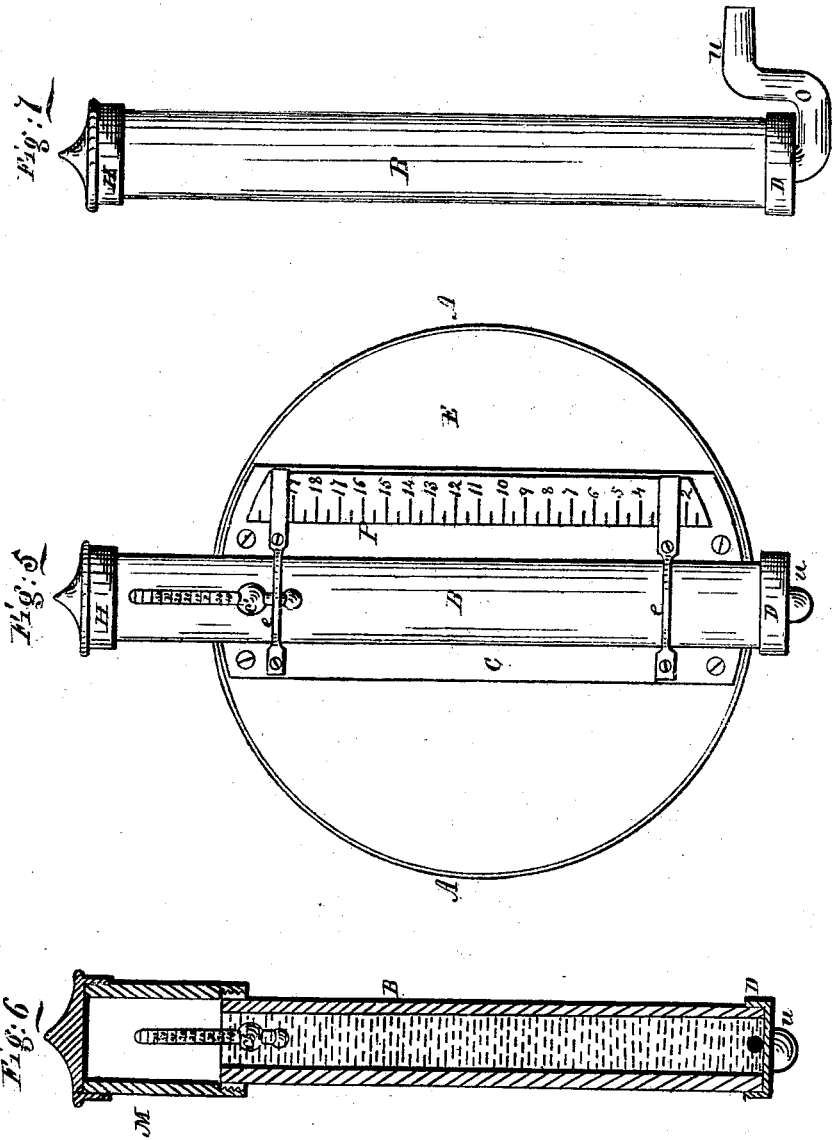

SAMUEL R. P. CAMP, OF NEW YORK, N. Y.

Letters Patent No. 103,976, dated June 7, 1870.

IMPROVEMENT IN COMBINED LIQUID GAUGE AND HYDROMETER.

The Schedule referred to in these Letters Patent and making part of the same

*To all whom it may concern:*

Be it known that I, SAMUEL R. P. CAMP, of the city, county, and State of New York, have invented a new and useful Apparatus for Gauging the Quantity and Testing the Proof or Specific Gravity of Liquids; and I do hereby declare that the following is a full and exact description thereof, reference being had to the accompanying drawings and to the letters of reference marked thereon.

The nature of my invention consists in the arrangement of a gauge for measuring or determining the quantity, in combination with a hydrometer for testing the proof or specific gravity of liquids.

To enable others skilled in the art to make and use my new apparatus for measuring and testing liquids, I will proceed to describe the same in detail, in which—

Figure 1 is an end elevation of a cask or barrel having my apparatus applied thereto.

Figure 2 is a detached view of a modified form of the tubes, through which the liquid is seen, to determine its proof and the quantity contained in the vessel.

Figure 3 is a view of the graduated gauge-plate removed, showing its adjustability.

Figure 4 is a vertical longitudinal section of a cask or barrel, having my apparatus applied thereto.

Figure 5 is an end view of a cask or barrel, showing the graduated gauge-plate in position, and the tube extending above and below the barrel.

Figure 6 is a vertical section of the tube or pipe detached from the cask, and provided with a removable cap secured to its upper end.

Figure 7 is a side elevation of the tube, also detached, showing the form of its connection with the cask.

A, in the annexed drawings, represents a cask or barrel, of the usual form and construction, to which my gauge P for determining the quantity contained therein is applied; also, a hydrometer, $c'$, in combination therewith, to test the proof or specific gravity of the liquid.

Upon a plate, C, secured to the head of the cask A, containing the liquid to be measured and tested by this apparatus, is mounted a glass or transparent tube, B, and retained in position upon this plate C by straps $e$.

To the lower end of this tube B is fitted a cap, D, from which extends a stem, $u$, through the head E of the cask A containing the liquid, connecting the tube B with the interior of the cask, so that the liquid may find its level in the tube B.

To the upper end of this transparent tube B is fitted a cover, which serves to prevent the loss of liquid when moving the cask, and accident to the hydrometer by its falling out of the tube.

To the plate C of this apparatus is arranged an adjustable and removable gauge-plate, P, parallel with and near to the glass tube B, containing the liquid to be measured, which is divided and subdivided so as to indicate, by the numbers marked thereon, the quantity, more or less, that may be contained in the cask.

This graduated gauge may be retained in position by the extended ends of the straps $e$, or in any other convenient manner, and is adjustable perpendicularly, so as to be adapted to the differently-formed casks or barrels to which it may be applied, and is removable so as to be replaced by a differently-graduated gauge, if required.

To connect this transparent or glass tube B with the vessel containing the liquid to be measured and tested, so as to equalize the atmospheric pressure above the liquid in the tube and cask B, that the liquid may find its level, as shown in fig. 4, the upper end may be provided with a stem, F, (see dotted lines,) extending into the cask, similar to the stem $u$ at the lower end, or a small opening, $c$, through the cap H, to allow the air to escape, may be made.

If to gauge the quantity and test the proof of liquids in different or separate tubes be desired or preferred, a bent tube, W, somewhat in the form of the letter U, may be employed, as represented in fig. 2, the one arm, $g$, receiving the hydrometer $c'$, and the other arm, $m$, simply exhibiting the quantity of liquid contained in the cask or barrel, and indicated by the gauge-plate P.

To test and gauge in casks which are somewhat larger at the middle than the ends, the tube B may extend both above and below the upper and lower sides, as shown in fig. 5, in which case a bent connection, O, may be used, as shown in fig. 7.

Fig. 6 represents the tube B the length of the diameter of the barrel-head only, and in order to provide for the stem $r$ of the hydrometer when the cask is full, or nearly so, a removable cap, M, may be provided, which can be dispensed with when transporting the cask, if necessary.

It is obvious that many different forms may be used to effect the purpose of measuring the quantity and indicating the proof of liquids by one apparatus without departing from my invention, but the various ways or modifications exhibited here are deemed sufficient to fully illustrate and protect my invention.

Cases may be employed to inclose this apparatus to prevent accident, but a representation of which is not deemed necessary in this application for a patent, and is therefore omitted.

Having thus fully described my apparatus for measuring or gauging and testing the proof of liquids,

What I claim as my invention, and desire to secure by Letters Patent, is—

1. The combination of a transparent gauge, B, attached to a cask or vessel, E, for indicating the liquid contents thereof, with a hydrometer, c', for indicating the strength or specific gravity of the liquid, substantially as herein specified.

2. In combination with the foregoing, also the arrangement of an adjustable and removable scale, P, as set forth.

S. R. P. CAMP.

Witnesses:
S. W. WOOD,
THEO. HUMBERT.